US011444677B2

(12) United States Patent
Tumula et al.

(10) Patent No.: US 11,444,677 B2
(45) Date of Patent: Sep. 13, 2022

(54) COMMUNICATION DEVICES FOR EFFICIENT BEAM MANAGEMENT

(71) Applicant: Huawei Technologies Co., Ltd., Shenzhen (CN)

(72) Inventors: Chaitanya Tumula, Kista (SE); Neng Wang, Lund (SE); Bengt Lindoff, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 17/038,627

(22) Filed: Sep. 30, 2020

(65) Prior Publication Data
US 2021/0013952 A1 Jan. 14, 2021

Related U.S. Application Data

(63) Continuation of application No. PCT/EP2018/058769, filed on Apr. 5, 2018.

(51) Int. Cl.
*H04B 7/06* (2006.01)
*H04B 7/02* (2018.01)
*H04B 7/08* (2006.01)

(52) U.S. Cl.
CPC .......... *H04B 7/0695* (2013.01); *H04B 7/028* (2013.01); *H04B 7/0632* (2013.01); *H04B 7/088* (2013.01)

(58) Field of Classification Search
USPC ....................................................... 370/329
See application file for complete search history.

(56) References Cited

U.S. PATENT DOCUMENTS

| 2013/0039404 | A1* | 2/2013 | Chari | H04B 1/1036 375/296 |
| 2013/0072112 | A1* | 3/2013 | Gunnarsson | H04B 7/2606 455/9 |
| 2013/0225106 | A1* | 8/2013 | Clevorn | H04B 7/022 455/226.2 |
| 2013/0229307 | A1 | 9/2013 | Chang et al. | |
| 2014/0153423 | A1 | 6/2014 | Shin et al. | |
| 2014/0185481 | A1* | 7/2014 | Seol | H04W 52/24 370/252 |

(Continued)

FOREIGN PATENT DOCUMENTS

| CN | 101521651 A | 9/2009 |
| CN | 104185269 A | 12/2014 |

(Continued)

OTHER PUBLICATIONS

3rd Generation Partnership Project; Technical Specification Group Radio Access Network; NR; Physical layer procedures for data (Release 15), 3GPP TS 38.214 V15.0.0 (Dec. 2017), 71 pages.

*Primary Examiner* — Gregory B Sefcheck
*Assistant Examiner* — Majid Esmaeilian
(74) *Attorney, Agent, or Firm* — Slater Matsil, LLP

(57) ABSTRACT

A first communication device receives a first signal, the first signal being transmitted by a second communication device using a first spatial-domain transmit filter; determines, based on the first signal, a Line-of-Sight characteristic associated with the first spatial-domain transmit filter, and transmits a first control message to the second communication device, the first control message indicating the Line-of-Sight characteristic associated with the first spatial-domain transmit filter.

19 Claims, 6 Drawing Sheets

(56) References Cited

U.S. PATENT DOCUMENTS

| | | | |
|---|---|---|---|
| 2016/0212669 A1 | 7/2016 | Davis | |
| 2017/0111852 A1 | 4/2017 | Selen et al. | |
| 2017/0212244 A1 | 7/2017 | Park | |
| 2019/0297639 A1* | 9/2019 | Wang | H04B 7/0695 |
| 2021/0266914 A1* | 8/2021 | Yoo | H04L 5/0025 |
| 2021/0392709 A1* | 12/2021 | Legg | H04B 7/0408 |

FOREIGN PATENT DOCUMENTS

| | | |
|---|---|---|
| CN | 105790893 A | 7/2016 |
| CN | 105940552 A | 9/2016 |
| CN | 107181508 A | 9/2017 |
| WO | 2018004509 A1 | 1/2018 |

\* cited by examiner

COMMUNICATION DEVICES FOR EFFICIENT BEAM MANAGEMENT

CROSS-REFERENCE TO RELATED APPLICATIONS

This application is a continuation of International Application No. PCT/EP2018/058769, filed on Apr. 5, 2018, the disclosure of which is hereby incorporated by reference in its entirety.

TECHNICAL FIELD

The disclosure relates to a first communication device and a second communication device for efficient beam management based on reporting of Line-of-Sight characteristics. Furthermore, the disclosure also relates to corresponding methods and a computer program.

BACKGROUND

Traditionally, frequencies below 6 GHz are used for wireless communication. However, frequency spectrum suitable for wireless communication is scarce, and there is a need for finding more frequency spectrum for supporting the exponentially growing data usage in wireless communication networks. One way to address this problem is utilizing frequencies above 6 GHz. In the new radio (NR) systems, carrier frequencies above 6 GHz are introduced for wireless communication between a network access node and a client device such as a user equipment (UE).

Due to the severity of path loss at frequencies above 6 GHz, the network access nodes and client devices will be equipped with a large number of antennas, and beamformed transmissions will be used to overcome the loss of signal strength due to fading. The network access node uses one or more transmit beams formed using the antenna array at the network access node to communicate with the client device. Similarly, one or more receive beams are formed using the available antenna array at the client device to receive signals from the network access node. The client device performs measurements using one or more receive beams on the signals transmitted with the one or more transmit beams from the network access node and reports the measurement results in a channel state information (CSI) report to the network access node.

SUMMARY

An objective of embodiments of the disclosure is to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a first communication device for a wireless communication system, the first communication device being configured to receive a first signal which is transmitted using a first spatial-domain transmit filter from a second communication device; determine a Line-of-Sight characteristic associated with the first spatial-domain transmit filter based on the received first signal; and transmit a first control message to the second communication device, wherein the first control message indicates the Line-of-Sight characteristic associated with the first spatial-domain transmit filter.

The first signal can be a first reference signal, such as e.g. a channel state information reference signal or a synchronization signal block.

In this disclosure the term spatial-domain transmit filter is used to describe a certain spatial parameter setting or spatial filtering used in a transmitter. The spatial-domain transmit filter can be used in a radio transceiver configuration for directing the transmission of signals in a certain direction. Thereby, a spatial-domain transmit filter results in a transmit beam having a certain direction. Moreover, a spatial-domain transmit filter can correspond to a certain antenna port at the second communication device.

A Line-of-Sight characteristic associated with a spatial-domain transmit filter can in this disclosure be understood to mean a characteristic indicating whether the propagation channel associated with a transmit beam resulting from the spatial-domain transmit filter corresponds to a Line-of-Sight path between the transmitter and the receiver. Based on a comparison with e.g. a threshold value, the Line-of-Sight characteristic can be determined to correspond to a Line-of-Sight path or to correspond to a non-Line-of-Sight path.

An advantage of the first communication device according to the first aspect is that by determining the Line-of-Sight characteristic associated with the spatial-domain transmit filter, the first communication device can adjust its spatial-domain receive filter to improve the quality of signal reception. Furthermore, by transmitting the Line-of-Sight characteristic associated with the first spatial-domain transmit filter to the second communication device, the second communication device can adjust its spatial-domain transmit filter to improve the quality of signal reception at the first communication device.

In an implementation form of a first communication device according to the first aspect, the first communication device is further configured to obtain location information associated with the second communication device; select a first spatial-domain receive filter based on the obtained location information associated with the second communication device; receive the first signal using the first spatial-domain receive filter.

The Line-of-Sight characteristic of the propagation channel associated with the first spatial-domain transmit filter and determined based on the received first signal is thereby also associated with the first spatial-domain receive filter for the first communication device. However, the knowledge of the spatial-domain receive filter is transparent to the second communication device. Hence, in this disclosure, the Line-of-Sight characteristic of the propagation channel is associated only with the spatial-domain transmit filter for the second communication device.

In this disclosure the term spatial-domain receive filter of the first communication device is used to describe a certain spatial parameter setting or spatial filtering used in a receiver. The spatial-domain receive filter can be used in a radio transceiver configuration for directing the reception of signals in a certain direction. Thereby, a spatial-domain receive filter results in a receive beam having a certain direction.

An advantage with this implementation form is that the first communication device can use the location information of the second communication device to select the first spatial-domain receive filter such that the resulting first receive beam points in the direction of the Line-of-Sight path.

In an implementation form of a first communication device according to the first aspect, the first communication device is further configured to transmit the first control message only if the Line-of-Sight characteristic associated with the first spatial-domain transmit filter corresponds to a Line-of-Sight path.

Or in other words, the first communication device can further be configured to omit transmitting the first control message if the Line-of-Sight characteristic associated with the first spatial-domain transmit filter corresponds to a non-Line-of-Sight path.

An advantage with this implementation form is that signalling overhead is reduced when the first spatial-domain transmit filter corresponds to a non-Line-of-Sight path.

In an implementation form of a first communication device according to the first aspect, the first communication device is further configured to receive the first signal using the first spatial-domain receive filter; select a second spatial-domain receive filter based on the determined Line-of-Sight characteristic associated with the first spatial-domain transmit filter; receive a second signal from the second communication device using the selected second spatial-domain receive filter.

An advantage with this implementation form is that the first communication device can adjust the beamwidth and the direction of the second receive beam resulting from the second spatial-domain receive filter based on the determined Line-of-Sight characteristic associated with the first spatial-domain transmit filter. Thereby, the first communication device can perform efficient receive beam management.

In an implementation form of a first communication device according to the first aspect, the first communication device is further configured to select the second spatial-domain receive filter to result in a second receive beam having a narrower beamwidth than the beamwidth of a first receive beam resulting from the first spatial-domain receive filter if the determined Line-of-Sight characteristic associated with the first spatial-domain transmit filter corresponds to a Line-of-Sight path; and select the second spatial-domain receive filter to result in a second receive beam having a wider beamwidth than the beamwidth of a first receive beam resulting from the first spatial-domain receive filter if the determined Line-of-Sight characteristic associated with the first spatial-domain transmit filter corresponds to a non-Line-of-Sight path.

An advantage with this implementation form is that by adjusting the beamwidth of the second receive beam resulting from the second spatial-domain receive filter based on the determined Line-of-Sight characteristic associated with the first spatial-domain transmit filter, the first communication device can perform efficient receive beam management.

In an implementation form of a first communication device according to the first aspect, the first communication device is further configured to at least for the case in which the second receive beam has the narrower beamwidth than the first receive beam, select the second spatial-domain receive filter so that the resulting second receive beam is contained in the first receive beam.

An advantage with this implementation form is that when the propagation channel corresponds to a Line-of-Sight path, a narrower second receive beam pointing in the same direction as the first receive beam can be selected. Thereby, unwanted interference in the receive signals can be minimized.

In an implementation form of a first communication device according to the first aspect, determine the Line-of-Sight characteristic associated with the first spatial-domain transmit filter comprises estimate the propagation channel associated with the first spatial-domain transmit filter between the first communication device and the second communication device based on the received first signal so as to obtain a metric associated with the propagation channel; determine the Line-of-Sight characteristic based on the obtained metric.

An advantage with this implementation form is that it provides a solution that can be used to determine Line-of-Sight characteristic associated with the first spatial-domain transmit filter.

In an implementation form of a first communication device according to the first aspect, the metric associated with the propagation channel is any of a root-mean-square delay spread, a frequency selectivity, and a Rician factor.

An advantage with this implementation form is that by using the above mentioned metrics, determination of Line-of-Sight characteristic will be accurate.

In an implementation form of a first communication device according to the first aspect, the first communication device is further configured to estimate the propagation channel associated with the first spatial-domain transmit filter between the first communication device and the second communication device based on the received first signal so as to obtain channel state information; transmit the obtained channel state information in a channel state information report to the second communication device.

An advantage with this implementation form is that, in addition to the Line-of-Sight characteristic associated with the first spatial-domain transmit filter, channel state information associated with the first spatial-domain transmit filter is also obtained and transmitted to the second communication device. Thereby, the second communication device can use the channel state information associated with the first spatial-domain transmit filter to perform an improved transmit beam management and scheduling of resources.

In an implementation form of a first communication device according to the first aspect, the first communication device is further configured to transmit the channel state information report in the first control message.

An advantage with this implementation form is that both the channel state information report and the indication about the Line-of-Sight characteristic are transmitted in the same control message, thereby saving control channel resources.

In an implementation form of a first communication device according to the first aspect, the first communication device is further configured to transmit the channel state information report in a second control message separate from the first control message.

An advantage with this implementation form is that different error protection can be applied to the transmission of the channel state information report and the Line-of-Sight characteristic indication. Further, the two control messages can be transmitted with different periodicities depending on the requirements.

In an implementation form of a first communication device according to the first aspect, the obtained channel state information is at least one of a channel quality indicator, a precoding matrix indicator, a channel state information reference signal resource index, a strongest layer indicator, a rank indicator, or an L1-reference signal received power associated with the first spatial-domain transmit filter.

According to a second aspect of the disclosure, the above mentioned and other objectives are achieved with a second communication device for a wireless communication system, the second communication device being configured to transmit at least one first signal using at least one first spatial-domain transmit filter to a first communication device; receive a first control message from the first communication device in response to the transmission of the first signal, wherein the first control message indicates a Line-of-Sight characteristic associated with the first spatial-domain transmit filter; select at least one second spatial-domain transmit filter based on the indicated Line-of-Sight characteristic associated with the first spatial-domain transmit filter; transmit a second signal to the first communication device using the selected second spatial-domain transmit filter.

An advantage of the second communication device according to the second aspect is that the second communication device can select the second spatial-domain transmit filter such that the beamwidth and direction of the resulting second transmit beam can be adjusted to improve the signal reception at the first communication device.

In an implementation form of a second communication device according to the second aspect, the second communication device is further configured to select the second spatial-domain transmit filter to result in a second transmit beam having a narrower beamwidth than the beamwidth of a first transmit beam resulting from the first spatial-domain transmit filter if the determined Line-of-Sight characteristic associated with the first spatial-domain transmit filter corresponds to a Line-of-Sight path; and select the second spatial-domain transmit filter to result in a second transmit beam having a wider beamwidth than the beamwidth of a first transmit beam resulting from the first spatial-domain transmit filter if the determined Line-of-Sight characteristic associated with the first spatial-domain transmit filter corresponds to a non-Line-of-Sight path.

An advantage with this implementation form is that by adjusting the beamwidth of the second transmit beam resulting from the second spatial-domain transmit filter based on the determined Line-of-Sight characteristic associated with the first spatial-domain transmit filter, the second communication device can perform efficient transmit beam management.

In an implementation form of a second communication device according to the second aspect, the second communication device is further configured to receive a channel state information report comprising channel state information associated with the first spatial-domain transmit filter in the first control message or in a separate second control message from the first communication device; select the second spatial-domain transmit filter based on the Line-of-Sight characteristic associated with the first spatial-domain transmit filter and the channel state information associated with the first spatial-domain transmit filter.

An advantage with this implementation form is that by using the channel state information report comprising channel state information associated with the first spatial-domain transmit filter, in addition to using the indication about the Line-of-Sight characteristic associated with the first spatial-domain transmit filter, the second communication device can perform an improved transmit beam management and scheduling of resources.

According to a third aspect of the disclosure, the above mentioned and other objectives are achieved with a method for a first communication device, the method comprises receiving a first signal which is transmitted using a first spatial-domain transmit filter from a second communication device; determining a Line-of-Sight characteristic associated with the first spatial-domain transmit filter based on the received first signal; and transmitting a first control message to the second communication device, wherein the first control message indicates the Line-of-Sight characteristic associated with the first spatial-domain transmit filter.

The method according to the third aspect can be extended into implementation forms corresponding to the implementation forms of the first communication device according to the first aspect. Hence, an implementation form of the method comprises the feature(s) of the corresponding implementation form of the first communication device.

The advantages of the methods according to the third aspect are the same as those for the corresponding implementation forms of the first communication device according to the first aspect.

According to a fourth aspect of the disclosure, the above mentioned and other objectives are achieved with a method for a second communication device, the method comprises transmitting at least one first signal using at least one first spatial-domain transmit filter to a first communication device; receiving a first control message from the first communication device in response to the transmission of the first signal, wherein the first control message indicates a Line-of-Sight characteristic associated with the first spatial-domain transmit filter; selecting at least one second spatial-domain transmit filter based on the indicated Line-of-Sight characteristic associated with the first spatial-domain transmit filter; transmitting a second signal to the first communication device using the selected second spatial-domain transmit filter.

The method according to the fourth aspect can be extended into implementation forms corresponding to the implementation forms of the second communication device according to the second aspect. Hence, an implementation form of the method comprises the feature(s) of the corresponding implementation form of the second communication device.

The advantages of the methods according to the fourth aspect are the same as those for the corresponding implementation forms of the second communication device according to the second aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION OF ILLUSTRATIVE EMBODIMENTS

Figure 1:
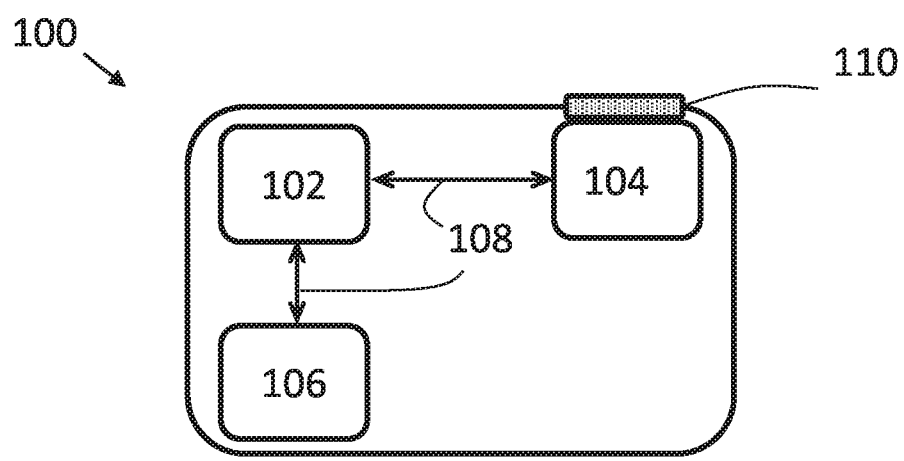
FIG. 1 shows a first communication device according to an embodiment of the disclosure.

FIG. 1 shows a first communication device 100 according to an embodiment of the disclosure. In the embodiment shown in FIG. 1, the first communication device 100 comprises a processor 102, a transceiver 104 and a memory 106. The processor 102 is coupled to the transceiver 104 and the memory 106 by communication means 108 known in the art. The first communication device 100 further comprises an antenna array 110 coupled to the transceiver 104, which means that the first communication device 100 is configured for wireless communications in a wireless communication system.

That the first communication device 100 is configured to perform certain actions should in this disclosure be understood to mean that the first communication device 100 comprises suitable means, such as e.g. the processor 102 and the transceiver 104, configured to perform said actions.

Figure 3:
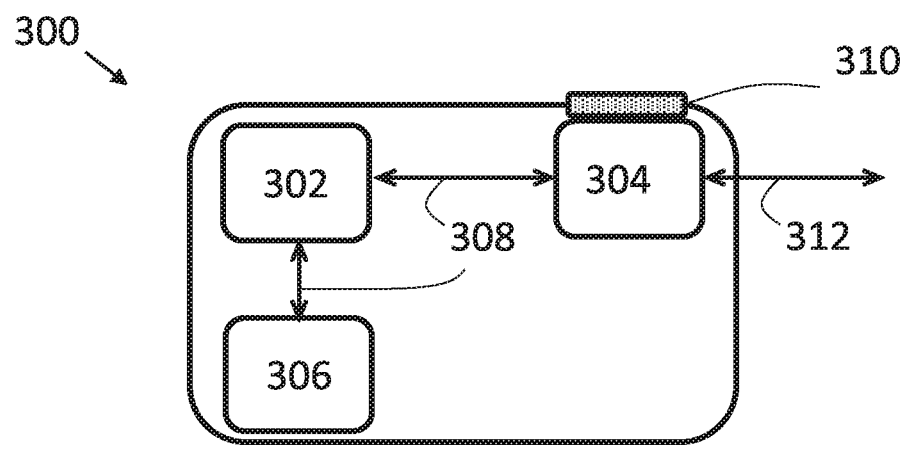
FIG. 3 shows a second communication device according to an embodiment of the disclosure.

The first communication device 100 is configured to receive a first signal which is transmitted using a first spatial-domain transmit filter from a second communication device 300 (shown in FIG. 3). The first signal may e.g. be a first reference signal. The first spatial-domain transmit filter results in a first transmit beam having a certain beamwidth and a certain direction. The beamwidth and the direction of the first transmit beam here refers to the beamwidth and the direction of the main lobe of the first transmit beam. Thus, the first signal is transmitted in the direction of the first transmit beam. Based on the received first signal, the first communication device 100 determines a Line-of-Sight characteristic associated with the first spatial-domain transmit filter. The determined Line-of-Sight characteristic can be used for receive beam management in the first communication device 100, as well as for transmit beam management in the second communication device 300. To allow the second communication device 300 to perform transmit beam management based on the determined Line-of-Sight characteristic, the first communication device 100 reports the determined Line-of-Sight characteristic to the second communication device 300 in a first control message 502 (shown in FIG. 9). Hence, the first communication device 100 is configured to transmit a first control message 502 to the second communication device 300, wherein the first control message 502 indicates the Line-of-Sight characteristic associated with the first spatial-domain transmit filter.

Figure 2:
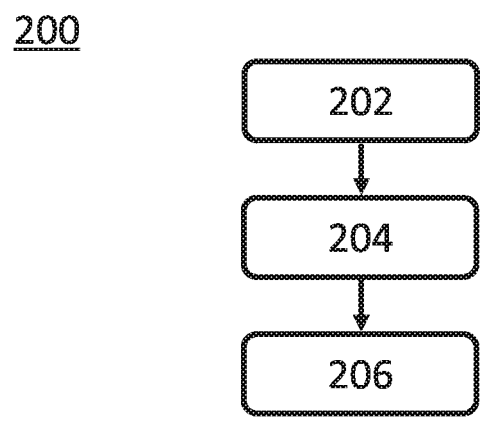
FIG. 2 shows a method according to an embodiment of the disclosure.

FIG. 2 shows a flow chart of a corresponding method 200 which may be executed in a first communication device too, such as the one shown in FIG. 1. The method 200 comprises receiving 202 a first signal which is transmitted using a first spatial-domain transmit filter from a second communication device 300. The method 200 further comprises determining 204 a Line-of-Sight characteristic associated with the first spatial-domain transmit filter based on the received first signal. Furthermore, the method 200 comprises transmitting 206 a first control message 502 to the second communication device 300, wherein the first control message 502 indicates the Line-of-Sight characteristic associated with the first spatial-domain transmit filter.

FIG. 3 shows a second communication device 300 according to an embodiment of the disclosure. In the embodiment shown in FIG. 3, the second communication device 300 comprises a processor 302, a transceiver 304 and a memory 306. The processor 302 is coupled to the transceiver 304 and the memory 306 by communication means 308 known in the art. The second communication device 300 may be configured for both wireless and wired communications in wireless and wired communication systems, respectively. The wireless communication capability is provided with an antenna array 310 coupled to the transceiver 304, while the wired communication capability is provided with a wired communication interface 312 coupled to the transceiver 304.

That the second communication device 300 is configured to perform certain actions should in this disclosure be understood to mean that the second communication device 300 comprises suitable means, such as e.g. the processor 302 and the transceiver 304, configured to perform said actions.

The second communication device 300 is configured to transmit at least one first signal using at least one first spatial-domain transmit filter to a first communication device 100. In other words, the second communication device 300 is configured to transmit the first signal in a first transmit beam resulting from the first spatial-domain transmit filter. In addition, the second communication device 300 may transmit the first signal in other transmit beams resulting from other spatial-domain transmit filters, as well as transmit other signals in the first transmit beam and/or the other transmit beams. In response to the transmission of the first signal in the first transmit beam, the second communication device 300 receives a first control message 502 from the first communication device 100. The first control message 502 indicates a Line-of-Sight characteristic associated with the first spatial-domain transmit filter. The second communication device 300 is configured to select at least one second spatial-domain transmit filter based on the indicated Line-of-Sight characteristic associated with the first spatial-domain transmit filter and transmit a second signal to the first communication device 100 using the selected second spatial-domain transmit filter. Thereby, the second communication device 300 can perform transmit beam management based on the Line-of-Sight characteristic associated with the first spatial-domain transmit filter reported by the first communication device 100 in the first control message 502.

Figure 4:
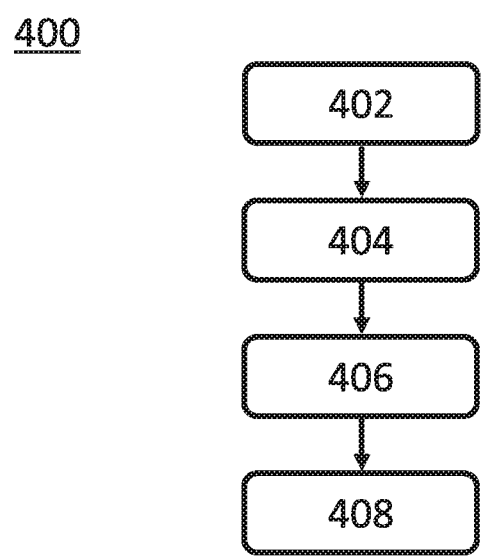
FIG. 4 shows a method according to an embodiment of the disclosure.

FIG. 4 shows a flow chart of a corresponding method 400 which may be executed in a second communication device 300, such as the one shown in FIG. 3. The method 400 comprises transmitting 402 at least one first signal using at least one first spatial-domain transmit filter to a first communication device 100. The method 400 further comprises receiving 404 a first control message 502 from the first communication device 100 in response to the transmission of the first signal. The first control message 502 indicates a Line-of-Sight characteristic associated with the first spatial-domain transmit filter. Furthermore, the method 400 comprises selecting 406 at least one second spatial-domain transmit filter based on the indicated Line-of-Sight characteristic associated with the first spatial-domain transmit filter and transmitting 408 a second signal to the first communication device 100 using the selected second spatial-domain transmit filter.

Figure 5:
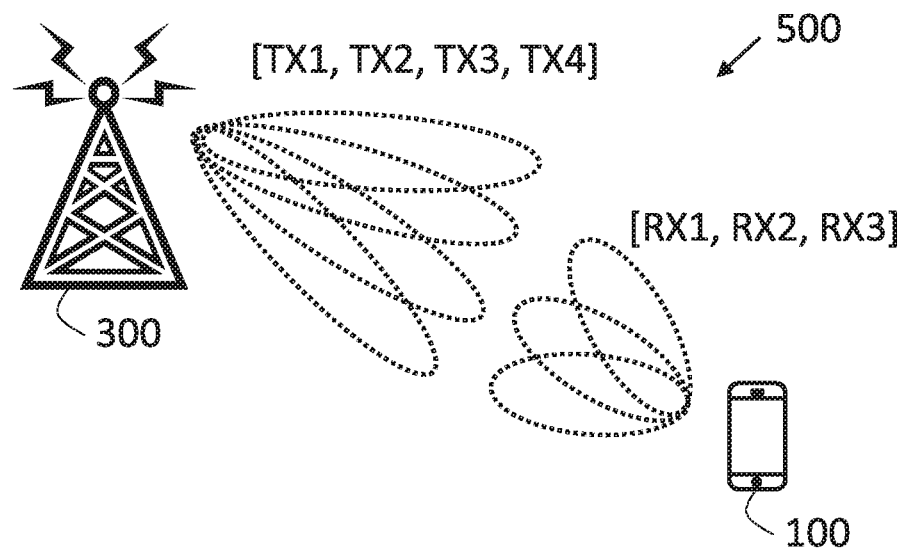
FIG. 5 shows a wireless communication system according to an embodiment of the disclosure.

FIG. 5 shows a wireless communication system 500 according to an embodiment of the disclosure. The wireless communication system 500 comprises a first communication device 100 and a second communication device 300 configured to operate in the wireless communication system 500. For simplicity, the wireless communication system 500 shown in FIG. 5 only comprises one first communication device 100 and one second communication device 300. However, the wireless communication system 500 may comprise any number of first communication devices 100 and any number of second communication devices 300 without deviating from the scope of the disclosure. Furthermore, although the second communication device 300 in FIG. 5 is shown as a network access node, the second communication device 300 may in embodiments instead be a client device or similar. In that case, the first communication device 100 may be a network access node or a client device.

In the embodiment shown in FIG. 5, the first communication device 100 and the second communication device 300 use beamforming to transmit and receive signals. The second communication device 300 transmits signals to the first communication device 100 in a set of transmit beams TX1, TX2, TX3, TX4. The signals transmitted may be downlink reference signals, e.g. a channel state information reference signal (CSI-RS) or a synchronization signal block (SSB). The downlink reference signals transmitted from the second communication device 300 can be used by the first communication device 100 to identify the best receive beam associated with each transmit beam TX1; TX2; TX3; TX4. The set of receive beams available at the first communication device 100 is shown in FIG. 5, and are denoted RX1, RX2, RX3. The first communication device 100 can measure and report CSI related parameters for each transmit and receive beam pair. According to embodiments of the disclosure the first communication device 100 may further determine and report if any of the transmit beams in the set of transmit beams TX1, TX2, TX3, TX4 correspond to a propagation channel between the second communication device 300 and the first communication device 100 device having Line-of-Sight characteristics. The first communication device 100 may determine the Line-of-Sight characteristics corresponding to each transmit beam TX1; TX2; TX3; TX4 based on a characteristic of the measured propagation channel corresponding to the transmit beam TX1; TX2; TX3; TX4, as will now be described with reference to FIG. 6.

Figure 6:
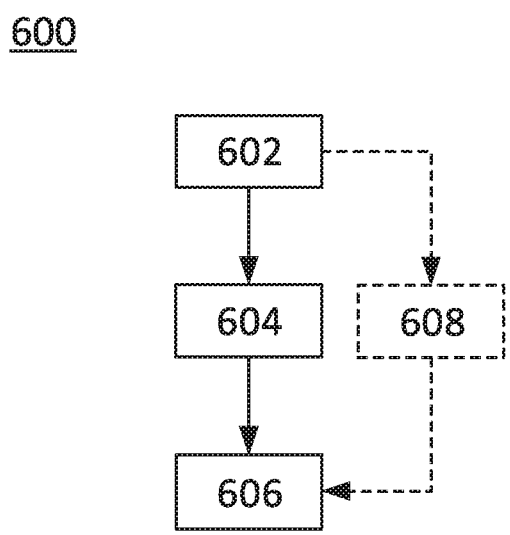
FIG. 6 shows a flow chart of a method according to an embodiment of the disclosure.

FIG. 6 shows a flow chart of a method 600 for determining and reporting a Line-of-Sight characteristic associated with a transmit beam. The method 600 may be performed in a first communication device, such as e.g. the first communication device 100 shown in FIG. 1. In step 602, the first communication device 100 receives a first signal which is transmitted from a second communication device 300. The second communication device 300 transmits the first signal, e.g. a reference signal, using a first spatial-domain transmit filter resulting in a first transmit beam. The first communication device 100 may receive the first signal using a first spatial-domain receive filter resulting in a first receive beam.

According to embodiments of the disclosure the first communication device 100 may select the first spatial-domain receive filter and hence the first receive beam for receiving the first signal in step 602 based on location information associated with the second communication device 300. The first communication device 100 may obtain the location information associated with the second communication device 300 from the second communication device 300 or from another communication device, e.g. in a control message. When the first communication device 100 has obtained location information associated with the second communication device 300, the first communication device 100 may select the first spatial-domain receive filter based on the obtained location information associated with the second communication device 300. The first communication device 100 further receives the first signal using the selected first spatial-domain receive filter. In this way, the Line-of-Sight characteristic associated with the first spatial-domain transmit filter determined based on the received first signal is also associated with the first spatial-domain receive filter.

The location information may indicate a geographical location of the second communication device 300. The geographical location may be expressed in global coordinates and may e.g. comprise longitude, latitude and elevation information. Based on the location information associated with the second communication device 300 and its own location information, the first communication device 100 can determine the Line-of-Sight path of an incoming signal from the second communication device 300, i.e. the direction of arrival (DoA) of the (Line-of-Sight path) signal in the azimuth and elevation planes, using known methods. Thus, by determining the DoA of the first signal, the first communication device 100 may select the first spatial-domain receive filter to result in a first receive beam pointing in the direction corresponding to the DoA of the first signal from the second communication device 300. Additional information such as orientation and movement of the first communication device 100 and the second communication device 300 may be used together with the location information when selecting the first spatial-domain receive filter. The first communication device 100 may obtain its own orientation and movement e.g. from gyroscopic sensors and motion sensors in the first communication device 100 and the orientation and movement if the second communication device 300 from the second communication device 300, e.g. in a control message.

In step 604, the first communication device 100 determines a Line-of-Sight characteristic associated with the first spatial-domain transmit filter based on the received first signal. Step 604 may comprise the first communication device 100 estimating the propagation channel associated with the first spatial-domain transmit filter between the first communication device 100 and the second communication device 300 based on the received first signal so as to obtain a metric associated with the propagation channel. Based on the obtained metric, the first communication device 100 may determine the Line-of-Sight characteristic. The metric associated with the propagation channel may e.g. be any of a root-mean-square delay spread, a frequency selectivity, and a Rician factor. However, also other known metrics may be used to determine the Line-of-Sight characteristic.

Figure 7:
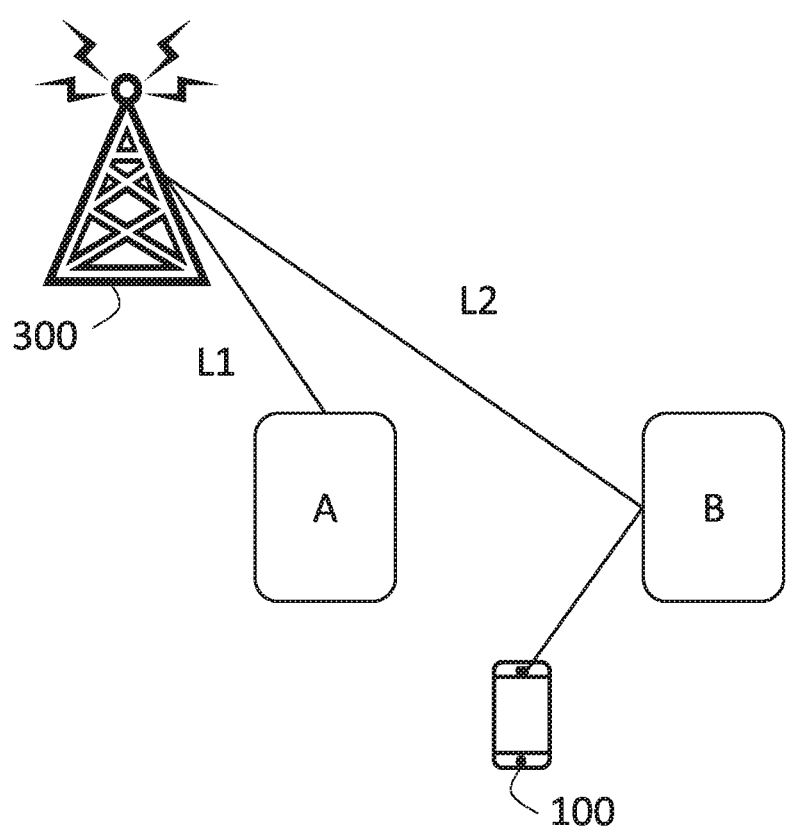
FIG. 7 shows a non-Line-of-Sight link corresponding to a Line-of-Sight path according to an embodiment of the disclosure.

The Line-of-Sight characteristic may in embodiments be determined to correspond to a Line-of-Sight path or to correspond to a non-Line-of-Sight path. In such embodiments, a metric associated with the propagation channel may be determined as previously described and compared to a threshold value. For example, when the obtained metric is above a certain threshold value, the Line-of-Sight characteristic is determined to correspond to a Line-of-Sight path. On the other hand, when the obtained metric is equal to or below the certain threshold value, the Line-of-Sight characteristic is determined to not correspond to a Line-of-Sight path. Note that, the Line-of-Sight characteristic of a propagation channel between the second communication device 300 and the first communication device 100 may correspond to a Line-of-Sight path even if the link between them is a non-Line-of-Sight link. This may e.g. be the case for a non-Line-of-Sight link with a single strong reflection path between the second communication device 300 and the first communication device 100. Such a scenario is shown in FIG. 7. In FIG. 7, a Line-of-Sight link L1 between the second communication device 300 and the first communication device 100 is blocked by an obstacle A. However, a non-Line-of-Sight link L2 between the second communication device 300 and the first communication device 100 corresponds to a Line-of-Sight path due to the single strong reflection path caused by obstacle B.

When the first communication device 100 has determined Line-of-Sight characteristic, the first communication device 100 reports the determined Line-of-Sight characteristic to the second communication device 300 in step 606. The reporting may comprise the first communication device 100 transmitting a first control message 502 to the second communication device 300, wherein the first control message 502 indicates the Line-of-Sight characteristic associated with the first spatial-domain transmit filter. The Line-of-Sight characteristic may be indicated using a bit representation, e.g. a single bit where a "1" indicates that the first spatial-domain transmit filter corresponds to a Line-of-Sight path and a "0" indicates that the first spatial-domain transmit filter corresponds to a non-Line-of-Sight path.

According to embodiments of the disclosure the first communication device 100 may only transmit the first control message 502 if the Line-of-Sight characteristic associated with the first spatial-domain transmit filter determined in step 604 corresponds to a Line-of-Sight path. Thus, if the Line-of-Sight characteristic associated with the first spatial-domain transmit filter does not corresponds to a Line-of-Sight path, the first communication device 100 may omit transmitting the first control message 502.

The method 600 may be repeated and hence used to determine and report the Line-of-Sight characteristic associated with different spatial-domain transmit filters used by the second communication device 300, i.e. the Line-of-Sight characteristic associated with different transmit beams. For example, the first communication device 100 may in step 602 receive the first signal which is transmitted using a second spatial-domain transmit filter from the second communication device 300 and further in step 604 determine a Line-of-Sight characteristic associated with the second spatial-domain transmit filter based on the received first signal. When the Line-of-Sight characteristic associated with more than one spatial-domain transmit filter is determined, the determined Line-of-Sight characteristic associated with each spatial-domain transmit filter may be reported separately or together. Thus, the first control message 502 may indicate the Line-of-Sight characteristic associated with one or more spatial-domain transmit filters. Furthermore, the first control message 502 may in embodiments only indicate the Line-of-Sight characteristic associated with the spatial-domain transmit filters whose Line-of-Sight characteristic corresponds to a Line-of-Sight path.

In embodiments, the first communication device 100 may in step 602 receive the first signal using different spatial-domain receive filters, where the first signal may further be transmitted using different spatial-domain transmit filters. From the different spatial-domain receive filters used to receive the first signal, the first communication device 100 may select the best spatial-domain receive filter for each spatial-domain transmit filter used to transmit the first signal. In other worlds, the first communication device 100 selects a combination of a transmit beam and a receive beam. The first communication device 100 may in step 604 determine the Line-of-Sight characteristic associated with each selected combination of transmit and receive beams and further report the determined the Line-of-Sight characteristic associated with each selected combination of transmit and receive beams in step 606. The best spatial-domain receive filter for a given spatial-domain transmit filter may e.g. correspond to the spatial-domain receive filter maximizing the L1-reference signal received power over all possible spatial-domain receive filters available at the first communication device too.

In addition to determining the Line-of-Sight characteristic associated with the first spatial-domain transmit filter, the first communication device 100 may further obtain channel state information associated with the first spatial-domain transmit filter based on the received first signal in an optional step 608 shown in FIG. 6. The first communication device 100 may obtain the channel state information by estimating the propagation channel associated with the first spatial-domain transmit filter between the first communication device 100 and the second communication device 300 based on the received first signal. The obtained channel state information may be at least one of a channel quality indicator, a precoding matrix indicator, a channel state information reference signal resource index, a strongest layer indicator, a rank indicator, or an L1-reference signal received power associated with the first spatial-domain transmit filter.

To inform the second communication device 300 about the obtained channel state information, the first communication device 100 may transmit the obtained channel state information in a channel state information report to the second communication device 300. The first communication device 100 may transmit the channel state information report in the first control message 502, such that the first control message 502 indicates both the channel state information and the Line-of-Sight characteristic associated with the first spatial-domain transmit filter. However, the first communication device 100 may instead transmit the channel state information report in a second control message 504 separate from the first control message 502. Hence, when the optional step 608 in method 600 is performed, step 606 may comprise the first communication device 100 transmitting a first control message 502 indicates both the channel state information and the Line-of-Sight characteristic associated with the first spatial-domain transmit filter; or the first communication device 100 transmitting a first control message 502 indicating the Line-of-Sight characteristic associated with the first spatial-domain transmit filter and a second control message 504 indicating the channel state information associated with the first spatial-domain transmit filter.

Figure 8A:
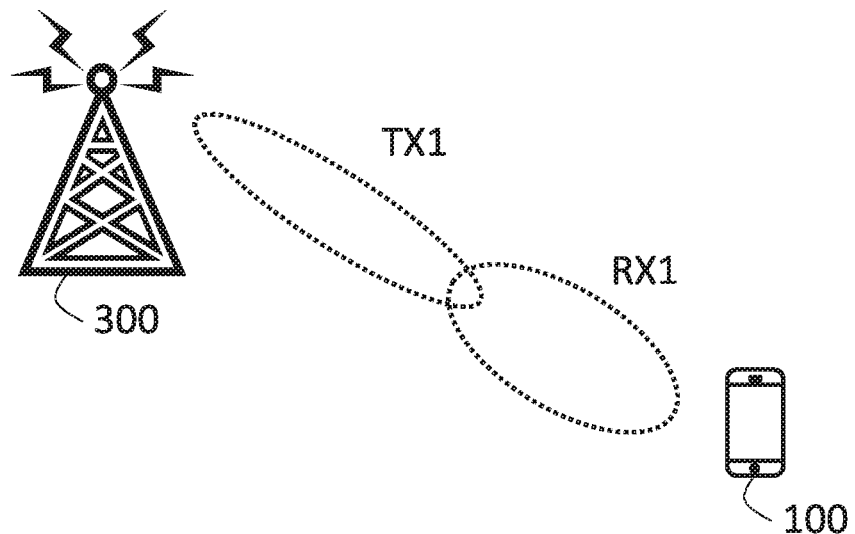
FIG. 8a-b show receive beam selection according to an embodiment of the disclosure.
Figure 8B:
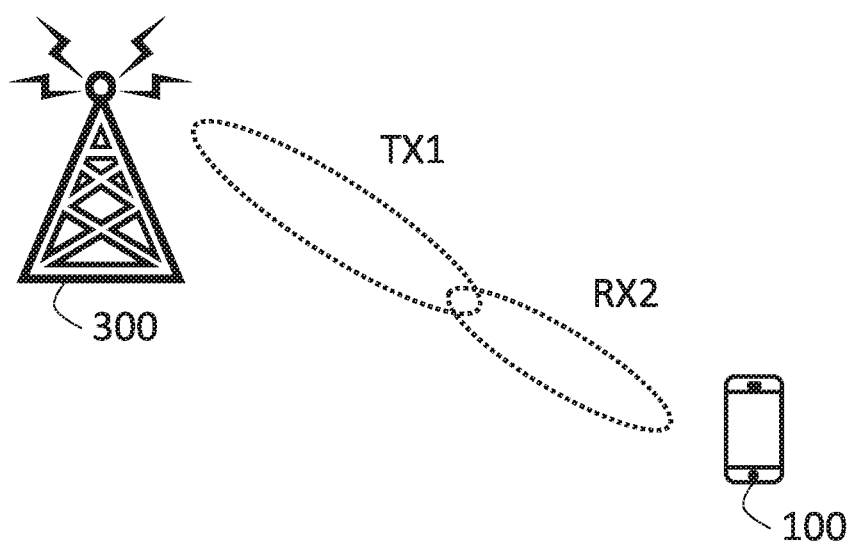

According to embodiments of the disclosure the determined the Line-of-Sight characteristic may be used to perform receive beam management in the first communication device 100. The first communication device 100 may e.g. select a second spatial-domain receive filter based on the determine Line-of-Sight characteristic associated with the first spatial-domain transmit filter. FIG. 8a-b show such a selection according to an embodiment of the disclosure. In FIG. 8a, the second communication device 300 transmits a first signal using a first spatial-domain transmit filter resulting in a first transmit beam TX1. The first communication device 100 receives the first signal using the first spatial-domain receive filter resulting in a first receive beam RX1. Based on the first signal received with the first receive beam RX1, the first communication device 100 determines the Line-of-Sight characteristic associated with the first spatial-domain transmit filter, i.e. associated with the first transmit beam TX1 shown in FIG. 8a. The Line-of-Sight characteristic may be determined as previously described with reference to FIG. 6. Based on the determined Line-of-Sight characteristic associated with the first spatial-domain transmit filter, the first communication device 100 may select a second spatial-domain receive filter. The second spatial-domain receive filter results in a second receive beam RX2 shown in FIG. 8b. The first communication device 100 may further receive a second signal from the second communication device 300 using the selected second spatial-domain receive filter resulting in the second receive beam RX2. The second signal may e.g. be a data signal, a control signal, or a reference signal.

The first communication device 100 may select the second spatial-domain receive filter to result in a second receive beam RX2 having a narrower beamwidth than the beamwidth of the first receive beam RX1 resulting from the first spatial-domain receive filter, if the determined Line-of-Sight characteristic associated with the first spatial-domain transmit filter corresponds to a Line-of-Sight path. In FIG. 8a-b, the determined Line-of-Sight characteristic associated with the first transmit beam TX1 is assumed to correspond to a Line-of-Sight path and hence the first communication device too can receive further signals transmitted in the first transmit beam TX1 with a narrow receive beam. In this case, the first communication device 100 therefore selects the second receive beam RX2 to have a narrower beamwidth than the beamwidth of the first receive beam RX1 and point in the same direction as the first receive beam RX1, as shown in FIG. 8a-b. However, if the determined Line-of-Sight characteristic associated with the first spatial-domain transmit filter corresponds to a non-Line-of-Sight path, the first communication device too may select the second spatial-domain receive filter to result in a second receive beam having a wider beamwidth than the beamwidth of a first receive beam resulting from the first spatial-domain receive filter (not shown in Figs.). In this way, the beamwidth of the second receive beam may be adapted depending on the Line-of-Sight characteristic of the first transmit beam resulting from the first spatial-domain transmit filter.

Furthermore, at least for the case in which the second receive beam has the narrower beamwidth than the first receive beam, the first communication device 100 may select the second spatial-domain receive filter so that the resulting second receive beam is contained in the first receive beam, i.e. the main lobe of the second receive beam points in the same direction as the main lobe of the first receive beam, but the main lobe of the second receive beam has a smaller beamwidth than the beamwidth of the main lobe of the first receive beam.

Figure 9:
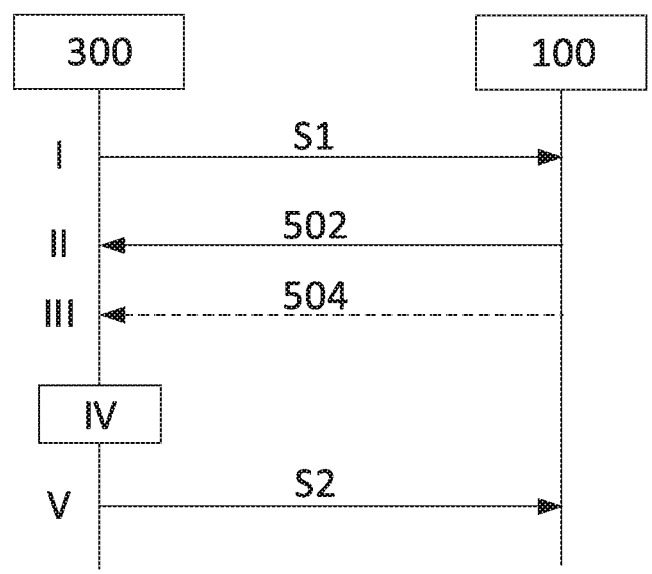
FIG. 9 shows signalling between a first communication device and a second communication device according to an embodiment of the disclosure.

According to embodiments of the disclosure the second communication device 300 may select one or more transmit beams for transmission of signals to a first communication device 100 based on Line-of-Sight characteristics reported from the first communication device 100. FIG. 9 shows the signaling between the second communication device 300 and a first communication device 100 according to such an embodiment. In step I in FIG. 9, the second communication device 300 transmits at least one first signal S1 using at least one first spatial-domain transmit filter to the first communication device 100. In response to the transmission of the first signal, the second communication device 300 receives a first control message 502 from the first communication device 100, as shown in step II in FIG. 9. The first control message 502 indicates a Line-of-Sight characteristic associated with the first spatial-domain transmit filter. The indicated Line-of-Sight characteristic may have been determined by the first communication device 100 based on the first signal S1 as previously described.

In addition to the Line-of-Sight characteristic, the second communication device 300 may receive a channel state information report comprising channel state information associated with the first spatial-domain transmit filter from the first communication device 100. The channel state information report may be comprised in the first control message 502 received from the first communication device 100 in step II in FIG. 9. However, the channel state information report may instead be comprised in a separate second control message 504 from the first communication device 100, as indicated in optional step III in FIG. 9.

In step IV in FIG. 9, the second communication device 300 selects at least one second spatial-domain transmit filter based on the indicated Line-of-Sight characteristic associated with the first spatial-domain transmit filter. Step IV in FIG. 9 may comprise the second communication device 300 selecting the second spatial-domain transmit filter to result in a second transmit beam having a narrower beamwidth than the beamwidth of a first transmit beam resulting from the first spatial-domain transmit filter, if the determined Line-of-Sight characteristic associated with the first spatial-domain transmit filter corresponds to a Line-of-Sight path. Furthermore, step IV in FIG. 9 may comprise the second communication device 300 selecting the second spatial-domain transmit filter to result in a second transmit beam having a wider beamwidth than the beamwidth of a first transmit beam resulting from the first spatial-domain transmit filter, if the determined Line-of-Sight characteristic associated with the first spatial-domain transmit filter corresponds to a non-Line-of-Sight path.

In embodiments where the second communication device 300 has further received a channel state information report from the first communication device 100 in the first control message 502 or in the separate second control message 504, the received channel state information report may be considered in step IV in FIG. 9. Thus, step IV may comprise the second communication device 300 selecting the second spatial-domain transmit filter based on the Line-of-Sight characteristic associated with the first spatial-domain transmit filter and the channel state information associated with the first spatial-domain transmit filter.

The second communication device 300 uses the at least one second spatial-domain transmit filter selected in step IV in FIG. 9 to transmit further signals to the first communication device 100. This is shown in step V in FIG. 9, where the second communication device 300 transmits a second signal S2 to the first communication device 100 using the selected second spatial-domain transmit filter. The second signal S2 may e.g. be a data signal or a control signal.

In addition to the second signal S2 which may comprise data or control information, the second communication device 300 may transmit reference signals, e.g. CSI reference signals (not shown in FIG. 9). The second communication device 300 may transmit the reference signals to allow the first communication device 100 to e.g. perform beam tracking or identify new candidate beams in case of a beam failure. When the second signal is transmitted in a second transmit beam resulting from the selected second spatial-domain transmit filter, the reference signals may be transmitted in a number of transmit beams whose main lobes pointing directions are close to the main lobe pointing direction of the second transmit beam. Therefore, the second communication device 300 may, in addition to the selected second spatial-domain transmit filter, select additional spatial-domain transmit filters which result in additional transmit beams for transmission of reference signals.

According to embodiments of the disclosure the number of selected transmit beams for transmission of reference signals may be dependent on the Line-of-Sight characteristic associated with the second spatial-domain transmit filter used for transmitting the second signal. For example, if the Line-of-Sight characteristic associated with the second spatial-domain transmit filter corresponds to a Line-of-Sight path, a first number N1 of transmit beams are selected for transmission of reference signals. On the other hand, if the Line-of-Sight characteristic associated with the second spatial-domain transmit filter corresponds to a non-Line-of-Sight path, a second number N2 of transmit beams are selected for transmission of reference signals. The first number N1 of transmit beams may be selected to be smaller than the second number N2 of transmit beams.

The first communication device 100 and/or the second communication device 300 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The second communication device 300 and/or the first communication device 100 herein may also be denoted as a radio second communication device, an access second communication device, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio second communication devices may be of different classes such as e.g. macro eNodeB, home eNodeB or pico base station, based on transmission power and thereby also cell size. The radio second communication device can be a Station (STA), which is any device that contains an IEEE 802.11-conformant Media Access Control (MAC) and Physical Layer (PHY) interface to the Wireless Medium (WM). The radio second communication device may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first communication device 100 and the second communication device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device 100 and the second communication device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A first communication device, comprising:
   a processor; and
   a non-transitory computer-readable storage medium coupled to the processor and storing a program executable by the processor, the program including instructions to:
   receive a first signal, the first signal being transmitted by a second communication device using a first spatial-domain transmit filter;
   determine, based on the first signal, a Line-of-Sight characteristic associated with the first spatial-domain transmit filter, wherein the Line-of-Sight characteristic indicates whether a propagation channel associated with a transmit beam resulting from the first spatial-domain transmit filter corresponds to a Line-of-Sight path or a non-Line-of-Sight path between the second communication device and the first communication device, and different spatial-domain transmit filters correspond to the Line-of-Sight path and the non-Line-of-Sight path; and
   transmit a first control message to the second communication device, the first control message indicating the Line-of-Sight characteristic associated with the first spatial-domain transmit filter.

2. The first communication device according to claim 1, wherein the program further includes instructions to:
   obtain location information associated with the second communication device; and
   select a first spatial-domain receive filter based on the obtained location information associated with the second communication device; and wherein the instructions to receive the first signal comprise instructions to receive the first signal using the first spatial-domain receive filter.

3. The first communication device according to claim 1, wherein the instructions to transmit the first control message to the second communication device comprise instructions to:

transmit the first control message in response to the Line-of-Sight characteristic associated with the first spatial-domain transmit filter corresponding to the Line-of-Sight path.

4. The first communication device according to claim 1, wherein the instructions to receive the first signal comprise instructions to:

receive the first signal using a first spatial-domain receive filter; and wherein the program further includes instructions to:
select a second spatial-domain receive filter based on the determined Line-of-Sight characteristic associated with the first spatial-domain transmit filter; and
receive a second signal from the second communication device using the selected second spatial-domain receive filter.

5. The first communication device according to claim 4, wherein the instructions to select the second spatial-domain receive filter comprise instructions to:

select the second spatial-domain receive filter to cause a second receive beam to have a narrower beamwidth than a beamwidth of a first receive beam caused by the first spatial-domain receive filter, when the determined Line-of-Sight characteristic associated with the first spatial-domain transmit filter corresponds to the Line-of-Sight path; and select the second spatial-domain receive filter to cause the second receive beam to have a wider beamwidth than the beamwidth of a first receive beam caused by the first spatial-domain receive filter, when the determined Line-of-Sight characteristic associated with the first spatial-domain transmit filter corresponds to the non-Line-of-Sight path.

6. The first communication device according to claim 5, wherein the program further includes instructions to:

in response to the second receive beam having the narrower beamwidth than the first receive beam, select the second spatial-domain receive filter to cause the resulting second receive beam to be contained in the first receive beam.

7. The first communication device according to claim 1, wherein the instructions to determine the Line-of-Sight characteristic associated with the first spatial-domain transmit filter comprise instructions to:

estimate a propagation channel between the first communication device and the second communication device based on the received first signal, to obtain a metric associated with the propagation channel; and
determine the Line-of-Sight characteristic based on the obtained metric.

8. The first communication device according to claim 7, wherein the metric associated with the propagation channel is a root-mean-square delay spread, a frequency selectivity, or a Rician factor.

9. The first communication device according to claim 1, wherein the program further includes instructions to:

estimate a propagation channel between the first communication device and the second communication device based on the first signal, to obtain channel state information; and transmit the channel state information in a channel state information report to the second communication device.

10. The first communication device according to claim 9, wherein the program further includes instructions to:

transmit the channel state information report in the first control message.

11. The first communication device according to claim 9, wherein the program further includes instructions to:

transmit the channel state information report in a second control message separate from the first control message.

12. The first communication device according to claim 9, wherein the channel state information is a channel quality indicator, a precoding matrix indicator, a channel state information reference signal resource index, a strongest layer indicator, a rank indicator, or an L1-reference signal received power associated with the first spatial-domain transmit filter.

13. A second communication device, comprising:

a processor; and
a non-transitory computer-readable storage medium coupled to the processor and storing a program for execution by the processor, the program including instructions to:
transmit a first signal using a first spatial-domain transmit filter to a first communication device;
receive a first control message from the first communication device in response to the transmission of the first signal, wherein the first control message indicates a Line-of-Sight characteristic associated with the first spatial-domain transmit filter, wherein the Line-of-Sight characteristic indicates whether a propagation channel associated with a transmit beam resulting from the first spatial-domain transmit filter corresponds to a Line-of-Sight path or a non-Line-of-Sight path between the second communication device and the first communication device, and different spatial-domain transmit filters correspond to the Line-of-Sight path and the non-Line-of-Sight path;
select a second spatial-domain transmit filter based on the indicated Line-of-Sight characteristic associated with the first spatial-domain transmit filter; and
transmit a second signal to the first communication device using the selected second spatial-domain transmit filter.

14. The second communication device according to claim 13, wherein the instructions to select the second spatial-domain transmit filter comprise instructions to:

select the second spatial-domain transmit filter to cause a second transmit beam to have a narrower beamwidth than a beamwidth of a first transmit beam caused by the first spatial-domain transmit filter, when the determined Line-of-Sight characteristic associated with the first spatial-domain transmit filter corresponds to the Line-of-Sight path; and select the second spatial-domain transmit filter to cause the second transmit beam to have a wider beamwidth than a beamwidth of a first transmit beam caused by the first spatial-domain transmit filter, when the determined Line-of-Sight characteristic associated with the first spatial-domain transmit filter corresponds to the non-Line-of-Sight path.

15. The second communication device according to claim 13, wherein the program includes instructions to:

receive, from the first communication device in the first control message, a channel state information report comprising channel state information associated with the first spatial-domain transmit filter; and select the second spatial-domain transmit filter based on the Line-of-Sight characteristic associated with the first spatial-domain transmit filter and the channel state information associated with the first spatial-domain transmit filter.

16. A method, comprising:

receiving, by a first communications device from a second communication device, a first signal transmitted using a first spatial-domain transmit filter;

determining, by the first communications device based on the first signal, a Line-of-Sight characteristic associated with the first spatial-domain transmit filter, wherein the Line-of-Sight characteristic indicates whether a propagation channel associated with a transmit beam resulting from the first spatial-domain transmit filter corresponds to a Line-of-Sight path or a non-Line-of-Sight path between the second communication device and the first communication device, and different spatial-domain transmit filters correspond to the Line-of-Sight path and the non-Line-of-Sight path; and transmitting, by the first communications device, a first control message to the second communication device, the first control message indicating the Line-of-Sight characteristic associated with the first spatial-domain transmit filter.

17. A computer program storing a program code executable by a computer, wherein when the computer executes the code, the first communications device is caused to for perform the method according to claim 16.

18. A method, comprising:

transmitting, by a second communication device to a first communication device, a first signal using a first spatial-domain transmit filter;

receiving, by the second communication device, a first control message from the first communication device in response to the transmission of the first signal, wherein the first control message indicates a Line-of-Sight characteristic associated with the first spatial-domain transmit filter, wherein the Line-of-Sight characteristic indicates whether a propagation channel associated with a transmit beam resulting from the first spatial-domain transmit filter corresponds to a Line-of-Sight path or a non-Line-of-Sight path between the second communication device and the first communication device, and different spatial-domain transmit filters correspond to the Line-of-Sight path and the non-Line-of-Sight path;

selecting a second spatial-domain transmit filter based on the indicated Line-of-Sight characteristic associated with the first spatial-domain transmit filter; and transmitting a second signal to the first communication device using the selected second spatial-domain transmit filter.

19. A computer program storing a program code executable by a computer, wherein when the computer executes the code, the second communications device is caused to perform the method according to claim 18.

* * * * *